(12) United States Patent
Ohura

(10) Patent No.: US 6,543,502 B2
(45) Date of Patent: Apr. 8, 2003

(54) PNEUMATIC TIRES HAVING SIDEWALL REINFORCING RUBBER AND BEAD REINFORCING LAYER

(75) Inventor: Kenichi Ohura, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 5 days.

(21) Appl. No.: 09/793,906

(22) Filed: Feb. 28, 2001

(65) Prior Publication Data

US 2001/0022210 A1 Sep. 20, 2001

(30) Foreign Application Priority Data

Feb. 29, 2000 (JP) .................... 2000-054054

(51) Int. Cl.$^7$ .................. B60C 15/06; B60C 17/00
(52) U.S. Cl. .............. 152/517; 152/542; 152/555
(58) Field of Search ................ 152/517, 543, 152/555, 542

(56) References Cited

U.S. PATENT DOCUMENTS 6,360,799 B1 * 3/2002 Iwasaki .................. 152/51

FOREIGN PATENT DOCUMENTS

GB 2 138 367 0 A * 10/1984 .................. 152/517

* cited by examiner

Primary Examiner—Adrienne C. Johnstone
(74) Attorney, Agent, or Firm—Sughrue Mion, PLLC

(57) ABSTRACT

A pneumatic tire comprises a tread portion, a pair of sidewall portions, a pair of bead portions, a radial carcass toroidally extending between a pair of bead cores and wound around the bead core from an inside toward an outside in the radial direction, a bead filler, and a reinforcing rubber arranged at the inside of the sidewall portion in the widthwise direction of the tire, wherein at least one cord reinforcing layer made from a cord(s) extending in an angle direction of approximately 90° with respect to a radial line segment is arranged in a region ranging outward from a vicinity of the bead core in the radial direction and has a width in the radial direction of the tire corresponding to 10–50% of a section height of the tire.

8 Claims, 2 Drawing Sheets

PNEUMATIC TIRES HAVING SIDEWALL REINFORCING RUBBER AND BEAD REINFORCING LAYER

BACKGROUND OF THE INVENTION

1. Field of the Invention

This invention relates to a pneumatic tire and more particularly to an improvement of a run-flat tire which can largely extend a runnable distance of the flat tire or a running distance at a run-flat state while controlling an increase of a tire weight.

2. Description of Related Art

There have hitherto been proposed various run-flat tires capable of temporarily running during the puncture of the tire, and some tires among them are commercialized.

In order to extend the runnable distance during the puncture of the run-flat tire, it is general to suppress heat generation resulted from repetitive deformation accompanied with the rotation of the tire by controlling an expansion deformation of a sidewall portion outward in the widthwise direction of the tire and a bending deformation of a bead portion outward in the widthwise direction of the tire at a rim flange portion called as "a falling-down deformation of a bead portion" against a load applied to the flat tire. For the purpose of controlling each of the above deformations, it has widely been performed to thicken a gauge of a crescent-shaped reinforcing rubber arranged at the inside of the sidewall portion, to thicken a thickness of a bead filler arranged at an outer peripheral side of a bead core, to increase the number of carcass plies, or the like.

In the conventionally proposed run-flat tires, however, it is unavoidable to significantly increase the tire weight, and there are some cases where the tire weight increases to about 30%. Such an increase of the tire weight has problems such as degradation of fuel consumption, increase of rolling resistance, degradation of ride comfort to vehicle and degradation of the other various performances.

Although the quantity of heat generation is lowered by controlling the deformation of the tire, the increase of the volume in the members constituting the tire particularly increases the quantity of heat generation during the running under a high load fairly exceeding over the above lowered quantity of heat generation, which obstructs the extension of the running distance at the run-flat state and becomes a serious problem.

SUMMARY OF THE INVENTION

It is, therefore, an object of the invention to solve the afore-mentioned problems of the conventional technique and to provide a pneumatic tire capable of largely extending the running distance at the run-flat state under a high load by sufficiently enhancing the rigidity of the bead portion while advantageously controlling the increase of the tire weight.

According to the invention, there is the provision of in a pneumatic tire, particularly a pneumatic radial tire comprising a tread portion, a pair of sidewall portions each extending inwardly from each side of the tread portion in a radial direction, a pair of bead portions each arranged at an inside of the sidewall portion in the radial direction, a carcass toroidally extending between a pair of bead cores each embedded in the respective bead portion and wound around the bead core from an inside of the tire toward an outside thereof in the radial direction to form a turnup portion, a bead filler arranged between a main body portion of the carcass and the turnup portion thereof and adjacent to an outer peripheral surface of the bead core, and a reinforcing rubber arranged at the inside of the sidewall portion in the widthwise direction of the tire and having substantially a crescent shape at cross section thereof, an improvement wherein at least one cord reinforcing layer made from a cord(s) extending in an angle direction of approximately 90° with respect to a radial line segment is arranged in a region ranging outward from a vicinity of the bead core in the radial direction and has a width in the radial direction of the tire corresponding to 10–50% of a section height of the tire.

The term "section height of the tire" used herein means a section height defined in JATMA YEAR BOOK and concretely means half the difference between the overall diameter and the nominal rim diameter when the tire is mounted onto an approved rim and inflated at the recommended air pressure under no load. And also, the term "radial line segment" used herein means a plane including a rotating axis of the tire.

In the pneumatic tire according to the invention, the reinforcing rubber arranged at the inside of the sidewall portion and close to an inner face thereof mainly contributes to bear the weight of a vehicle body during the puncture of the tire to thereby control the expansion deformation of the sidewall portion in the widthwise direction, so that stress concentration into the sidewall portion and the carcass can advantageously be prevented during the puncture of the tire. And also, the cord reinforcing layer is arranged at least in the bead portion, wherein the increase of the weight is fairly less as compared with the case of increasing the gauge of the reinforcing rubber and the thickness of the bead filler, whereby the rigidity of the bead portion against the falling-down during the running at the run-flat state under the high load can sufficiently be increased to largely extend the running distance at the run-flat state.

Considering only the expansion deformation of the sidewall portion, particularly a zone of the sidewall portion located in the vicinity of a position of a maximum tire width, a force restraining the expansion deformation can effectively be enhanced by increasing the gauge of the reinforcing rubber or increasing the number of the carcass plies, while the falling-down deformation of the bead portion under a working condition of a relatively low load can be countered by increasing the thickness of the bead filler or the number of the carcass plies. In the latter case, however, the falling-down deformation of the bead portion can not effectively be restrained when a higher load is applied to the tire, and the concentration of such a deformation in the bead portion can not be dispersed, and hence there is caused a fear of breaking a zone of the bead portion located in the vicinity of a rim flange.

For this end, in the pneumatic tire according to the invention, the cord reinforcing layer is arranged at least in the bead portion, whereby each of the falling-down deformation and the expansion deformation in a zone ranging from the bead portion to the sidewall portion is effectively controlled and the concentration of such deformations is prevented, so that the run-flat durability is largely improved even under the higher load without substantially increasing the gauge of the reinforcing rubber and the thickness of the bead filler.

The cord reinforcing layer in such a tire functions to control the outward expansion deformation of the sidewall portion in the widthwise direction of the tire in the flat tire based on a high modulus of elasticity of the cord constituting the cord reinforcing layer and extending substantially in the circumferential direction of the tire, and to effectively restrain the outward falling-down of the carcass ply in the widthwise direction at least in the bead portion under a large cross angle between the cord in the cord reinforcing layer and the cord in the carcass ply, and to prevent separation between mutual cords in the carcass ply accompanied with the expansion deformation of the sidewall portion as mentioned above, and hence the weight of the vehicle body during the puncture of the tire can effectively be supported by the cord reinforcing layer.

In the invention, the cord constituting the cord reinforcing layer extends in an angle direction of approximately 90° with respect to the radial line segment, so that the cord is substantially continuous in the circumferential direction and can advantageously bear tension so as not to elongate in the circumferential direction. If the cord angle with respect to the radial line segment largely comes out from 90°, the cord becomes discontinuous in the circumferential direction and has free ends at the inside and outside in the radial direction, so that the above tension can not be born and the effect expected in the cord reinforcing layer can not sufficiently be developed and further the adhesion to the free end of the cord is insufficient to cause a fear of creating separation failure.

The cord reinforcing layer according to the invention is formed by spirally winding a single cord or a bundle of plural cords arranged side by side. In such a spirally wound structure, a joint part of the cord can be removed from the cord reinforcing layer to bear a larger tension in the circumferential direction, and hence the falling-down deformation of the bead portion can more effectively be restrained. In particular, when the bundle of plural cords is spirally wound, the formation of the cord reinforcing layer can be more facilitated. And also, the cord reinforcing layer may be formed by using a plurality of ring-shaped cords having different diameters.

Furthermore, the width of the cord reinforcing layer in the radial direction of the tire is within a range of not less than 10% but not more than 50% of the section height of the tire. When the width is not less than 10%, the rigidity can effectively be enhanced at least in the bead portion, preferably in a region ranging from the bead portion to the sidewall portion, while when the width is not more than 50%, the merit through the increase of the rigidity as compared with the increase of the tire weight can be ensured.

In the pneumatic tire according to the invention, therefore, the expansion deformation of the sidewall portion and the falling-down deformation of the bead portion are advantageously controlled under the action of the cord reinforcing layer without increasing the thickness of the bead filler and the gauge of the reinforcing rubber, whereby the effective extension of the running distance of the flat tire even under a higher load can be realized and also the increase of the tire weight can be controlled as small as possible.

In a preferable embodiment of the invention, the cord constituting the cord reinforcing layer is an organic fiber cord or a steel cord and has a modulus of elasticity of not less than 3.2 GPa, and an end count of cords in the cord reinforcing layer per a width of 10 mm is 3–10 cords.

In case of using the organic fiber cord, the tire weight can effectively be decreased as compared with the case of using the steel cord.

When the modulus of elasticity of the cord is not less than 3.2 GPa, the rigidities of the bead portion and the sidewall portion can sufficiently be enhanced to sufficiently control the expansion deformation of the sidewall portion and the falling-down deformation of the bead portion in the running at the run-flat state even under a higher load after the puncture of the tire.

When the end count is not less than 3 cords per 10 mm, the rigidities of the bead portion and the sidewall portion can sufficiently be enhanced, while when it is not more than 10 cords per 10 mm, the cord diameter can be ensured within an applicable range without extremely thinning it to advantageously enhance the rigidity of each respective portion.

BRIEF DESCRIPTION OF THE DRAWINGS

The invention will be described with reference to the accompanying drawings, wherein.

DETAILED DESCRIPTION OF THE INVENTION

Figure 1:
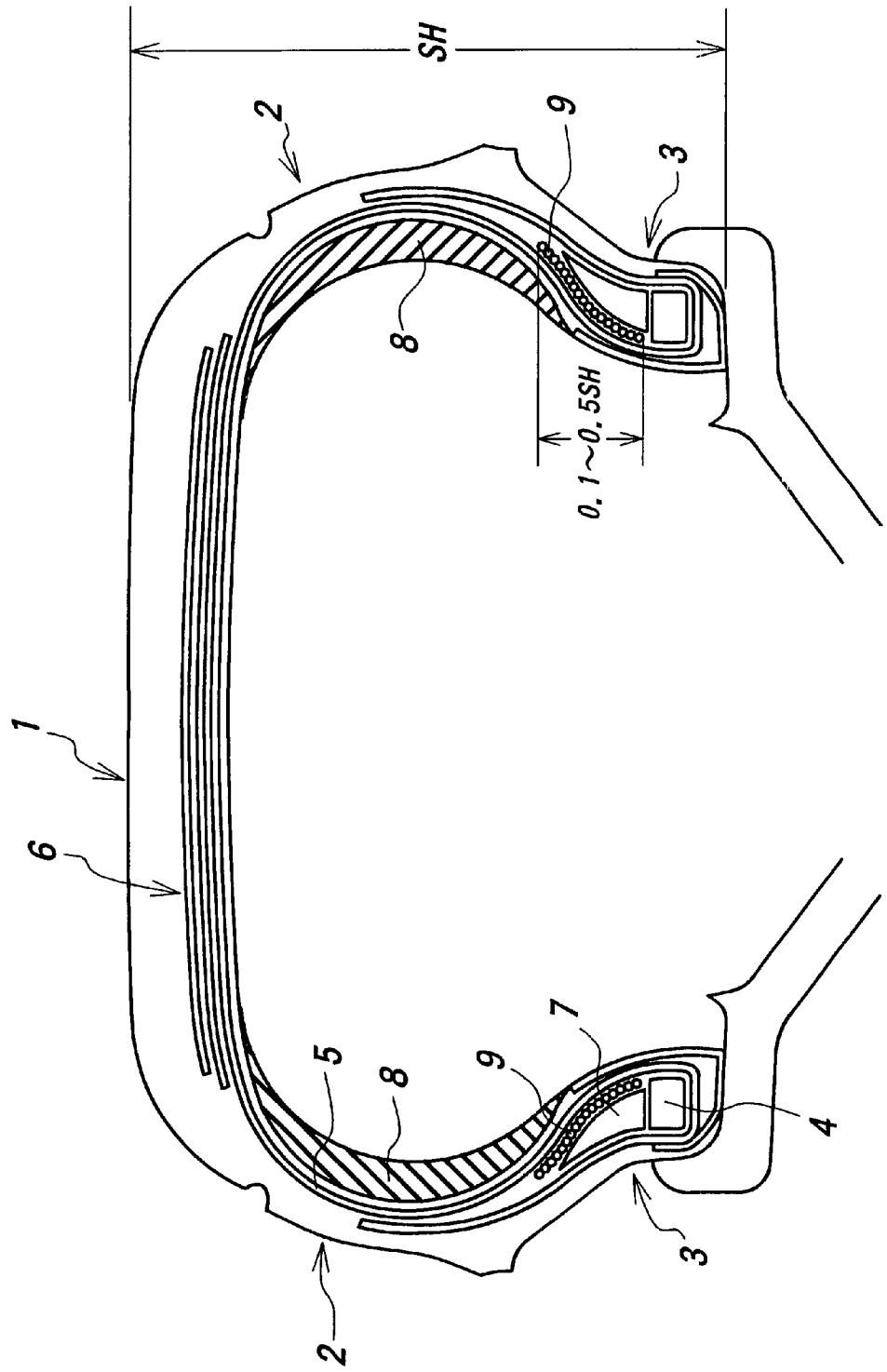
FIG. 1 is a diagrammatically section view of a pneumatic tire according to the invention.

In FIG. 1 is shown a diagrammatically section view of an embodiment of the pneumatic radial tire according to the invention at a state of assembling onto a rim and inflating under an air pressure, in which numeral 1 is a tread portion, numeral 2 a sidewall portion continuously extending inward from each side of the tread portion in a radial direction, and numeral 3 a bead portion continuously arranged at an inner peripheral side of the sidewall portion.

The terms "rim" and "air pressure" used herein mean an approved rim and a maximum air pressure defined in JATMA YEAR BOOK, respectively.

In the above tire, a radial carcass 5 comprised of at least one carcass ply is toroidally extended between a pair of bead cores 4 each embedded in the respective bead portion 3 to reinforce the above portions 1, 2 and 3, and wound around the bead core 4 from an inside of the tire toward outside thereof in a widthwise direction to form a turnup portion, and a belt 6 comprised of at least one belt layer, two belt layers in FIG. 1, is arranged at an outer peripheral side of a crown portion of the radial carcass 5.

Furthermore, a bead filler 7 having substantially a triangular shape in its cross section is arranged between a main body portion and a turnup portion of the radial carcass 6 and adjacent to an outer peripheral side of the bead core 4, and a reinforcing rubber 8 having substantially a crescent shape in its cross section is mainly arranged at an inside of the sidewall portion 2 in the widthwise direction of the tire. In addition, a cord reinforcing layer 9 having a spirally wound structure of a cord, preferably, an organic fiber cord extending in an angle direction of approximately 90° with respect to a radial line segment is arranged within a region ranging outward from the vicinity of the bead core 4 and inward from a turnup end of the radial carcass 5 in the radial direction and, for example, between the main body portion of the radial carcass 5 and the bead filler 7 in the illustrated embodiment.

Figure 2:
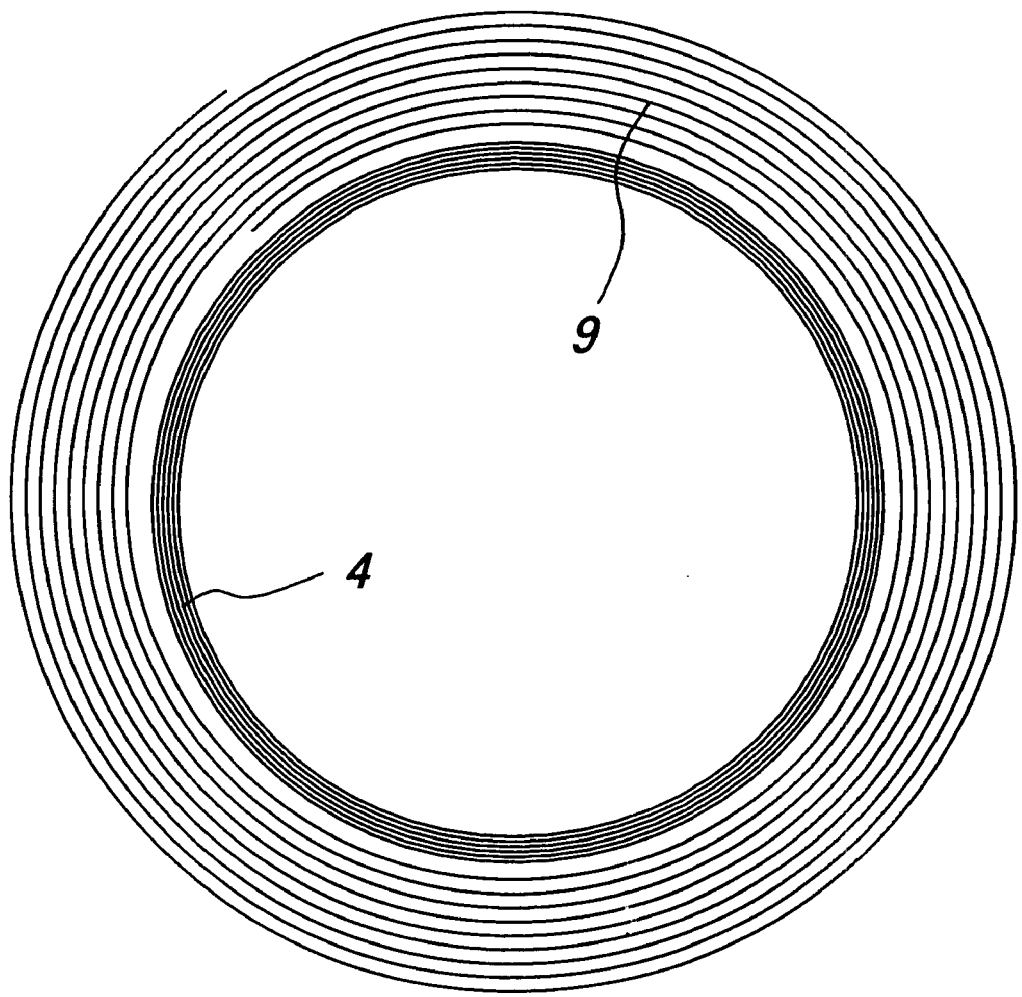
FIG. 2 is a diagrammatic view conceptually illustrating an interrelationship of a cord reinforcing layer and a bead core.

The term "spirally wound structure" used herein means a structure shown in FIG. 2. Therefore, the cord reinforcing layer 9 is formed by spirally winding a single cord or a bundle of plural cord as shown in FIG. 2.

Moreover, the cord reinforcing layer 9 may be arranged between the turnup portion of the radial carcass 5 and the bead filler 7, or may be arranged inside the main body portion of the radial carcass 5 or outside the turnup portion thereof in the widthwise direction.

The cord reinforcing layer 9 has a width in the radial direction of the tire corresponding to 10–50% of a section height SH of the tire. And also, the cord reinforcing layer 9 is an organic fiber cord having a modulus of elasticity of not less than 3.2 GPa, and an end count of cords in the cord reinforcing layer 9 is 3–10 cords per 10 mm.

According to the pneumatic tire having such a construction, the weight of the vehicle body can effectively be supported by the cord reinforcing layer 9 in addition to the reinforcing rubber 8, the bead filler 7 and the radial carcass 5 during the running of the tire at the run-flat state as mentioned above, so that the rigidities of the sidewall portion and the bead portion can sufficiently be enhanced even at a higher load under a slight increase of the weight resulted from the addition of the cord reinforcing layer 9 without substantially increasing the gauge of the reinforcing rubber 8 and the thickness of the bead filler 7 and without increasing the number of the carcass plies, and hence the running distance of the flat tire can largely be extended.

The following examples are given in illustration of the invention and are not intended as limitations thereof.

With respect to tires of Examples 1–8 and Comparative Examples 1–4 are measured modulus of elasticity of cord constituting cord reinforcing layer, tire weight, rigidity to falling-down deformation of bead portion or bending rigidity, and running distance of the flat tire.

Each of the above tires has a tire size of 225/60R16. The example tires have a structure shown in FIG. 1 and the comparative tires have such a structure that the cord reinforcing layer is omitted from FIG. 1. Moreover, the cord reinforcing layers in all example tires has a spirally wound structure of a single cord.

The tire weight is directly measured from the tire. The bending rigidity of the bead portion is evaluated by grasping a part of the bead portion and applying a constant weight to another part of the bead portion opposite to the above part with respect to a center of a circumference to measure a deformation quantity and then calculating a reciprocal number from the measured value. The running distance of the flat tire is evaluated by measuring a distance run on an oval circuit course at a speed of 100 km/h until the occurrence of trouble in a front left-wheeled tire among the tires mounted onto a passenger car at a state that a valve core is get out from the front left-wheeled tire and the other tires are inflated under a given air pressure.

The results are shown in Table 1. Moreover, the gauge of the reinforcing rubber, the tire weight, the bending rigidity of the bead portion and the running distance of the flat tire are represented by an index on the basis that the tire of Comparative Example 1 as a control is 100, in which the larger the measured value, the larger the index value.

TABLE 1

|  | Comparative Example 1 | Comparative Example 2 | Comparative Example 3 | Comparative Example 4 | Example 1 | Example 2 | Example 3 | Example 4 | Example 5 | Example 6 | Example 7 | Example 8 |
|---|---|---|---|---|---|---|---|---|---|---|---|---|
| Number of carcass plies | 1 | 1 | 2 | 1 | 1 | 1 | 1 | 1 | 1 | 1 | 1 | 1 |
| Gauge of reinforcing rubber | 100 | 110 | 100 | 100 | 100 | 100 | 100 | 100 | 100 | 100 | 100 | 100 |
| Cord reinforcing layer | none | none | none | presence (*1) | presence (*2) | presence (*2) | presence (*2) | presence (*2) | presence (*2) | presence (*2) | presence (*2) | presence (*2) |
| Width of cord reinforcing layer in radial direction with respect to tire section height (%) | — | — | — | 30 | 30 | 10 | 50 | 30 | 30 | 30 | 30 | 30 |
| End count in cord reinforcing layer (cords/10 mm) | — | — | — | 7 | 7 | 7 | 7 | 3 | 10 | 2 | 11 | 7 |
| Modulus of elasticity in cord of cord reinforcing layer (GPa) | — | — | — | 4 | 4 | 4 | 4 | 4 | 4 | 4 | 4 | 2 |
| Tire weight | 100 | 110 | 110 | 105 | 105 | 105 | 107 | 105 | 107 | 105 | 110 | 105 |
| Bending rigidity of bead portion | 100 | 102 | 102 | 115 | 110 | 105 | 112 | 105 | 112 | 101 | 112 | 105 |
| Running distance at run-flat state | 100 | 105 | 105 | 101 | 110 | 105 | 112 | 105 | 112 | 101 | 112 | 105 |

(*1) separated structure of cords 60° with respect to circumferential direction
(*2) spirally wound structure of single cord 90° with respect to circumferential direction As seen from the results of Table 1, the bending rigidity of the bead portion and the running distance of the flat tire in all tires of Examples 1–8 can considerably be improved though the tire weight is slightly increased as compared with that of Comparative Example 1.

As mentioned above, according to the invention, the expansion deformation of the sidewall portion and the falling-down deformation of the bead portion can effectively be controlled to largely extend the running distance of the flat tire under an action of the cord reinforcing layer without increasing the gauge of the reinforcing rubber and the thickness of the bead filler and the number of carcass plies and the like, that is, even by effectively controlling the increase of the tire weight.

What is claimed is:

1. In a pneumatic tire comprising a tread portion, a pair of sidewall portions each extending inwardly from each side of the tread portion in a radial direction, a pair of bead portions each arranged at an inside of the sidewall portion in the radial direction, a carcass toroidally extending between a pair of bead cores each embedded in the respective bead portion and wound around the bead core from an inside of the tire toward an outside thereof in the radial direction to form a turnup portion, a bead filler arranged between a main body portion of the carcass and the turnup portion thereof and adjacent to an outer peripheral surface of the bead core, and a run-flat reinforcing rubber arranged at the inside of the sidewall portion in the widthwise direction of the tire and having substantially a crescent shape at cross section thereof, an improvement wherein at least one cord reinforcing layer made from a cord(s) extending in an angle direction of approximately 90° with respect to a radial line segment is arranged in a region ranging outward from a vicinity of the bead core in the radial direction and has a width in the radial direction of the tire corresponding to 10–50% of a section height of the tire.

2. A pneumatic tire according to claim 1, wherein the cord constituting each cord reinforcing layer has a modulus of elasticity of not less than 3.2 GPa.

3. A pneumatic tire according to claim 1, wherein an end count of cords in each cord reinforcing layer per a width of 10 mm is 3–10 cords.

4. A pneumatic tire according to claim 1, wherein each cord reinforcing layer is formed by spirally winding a single cord or a bundle of plural cords arranged side by side.

5. A pneumatic tire according to claim 1, wherein each cord reinforcing layer is arranged between the main body portion of the carcass and the bead filler.

6. A pneumatic tire according to claim 1, wherein the carcass is comprised of a single carcass ply.

7. A pneumatic tire according to claim 1, wherein each cord reinforcing layer is arranged inward from the turnup end of the carcass in the radial direction.

8. A pneumatic tire according to claim 1, wherein each cord reinforcing layer is arranged in a region ranging outward from the upper end of the bead core in the radial direction.

* * * * *